United States Patent [19]

Lanzer

[11] Patent Number: 4,747,464
[45] Date of Patent: May 31, 1988

[54] DRIVE SYSTEM FOR MOTOR VEHICLES HAVING TWO DRIVEN AXLES

[75] Inventor: Heribert Lanzer, Gössendorf, Austria

[73] Assignee: Steyr-Daimler-Puch AG, Vienna, Austria

[21] Appl. No.: 12,737

[22] Filed: Feb. 9, 1987

[30] Foreign Application Priority Data

Feb. 10, 1986 [AT] Austria ................................. 315/86

[51] Int. Cl.$^4$ ............................................. B60K 17/34
[52] U.S. Cl. .................................... 180/248; 180/247; 74/682
[58] Field of Search ............... 180/247, 248, 249, 250; 74/665 B, 667, 681, 682

[56] References Cited

U.S. PATENT DOCUMENTS

| | | | |
|---|---|---|---|
| 4,466,502 | 8/1984 | Sakai | 180/247 |
| 4,562,897 | 1/1986 | Renneker | 180/247 |

FOREIGN PATENT DOCUMENTS 1802456 5/1969 Fed. Rep. of Germany .
1357106 6/1974 United Kingdom .
1509374 5/1978 United Kingdom .

Primary Examiner—John J. Love
Assistant Examiner—Donn McGiehan
Attorney, Agent, or Firm—Marmorek, Guttman & Rubenstein

[57] ABSTRACT

In a drive system for motor vehicles having two drive axles, one of said driven axles is driven by means comprising a liquid friction coupling. In order to permit the use of a relatively small liquid friction coupling and to permit the interdependence of the speed difference between the coupling halves of the liquid friction coupling and the torque transmission capacity to be modulated within a large range with simple means, one coupling half of the preferably controllable liquid friction coupling is held against rotation, the other coupling half is connected to one torque-transmitting member of a planetary gear train having three torque-transmitting members, another of said three torque-transmitting members is arranged to be driven by the motor, and the third of said torque-transmitting members is connected to the axles to drive the same.

5 Claims, 1 Drawing Sheet

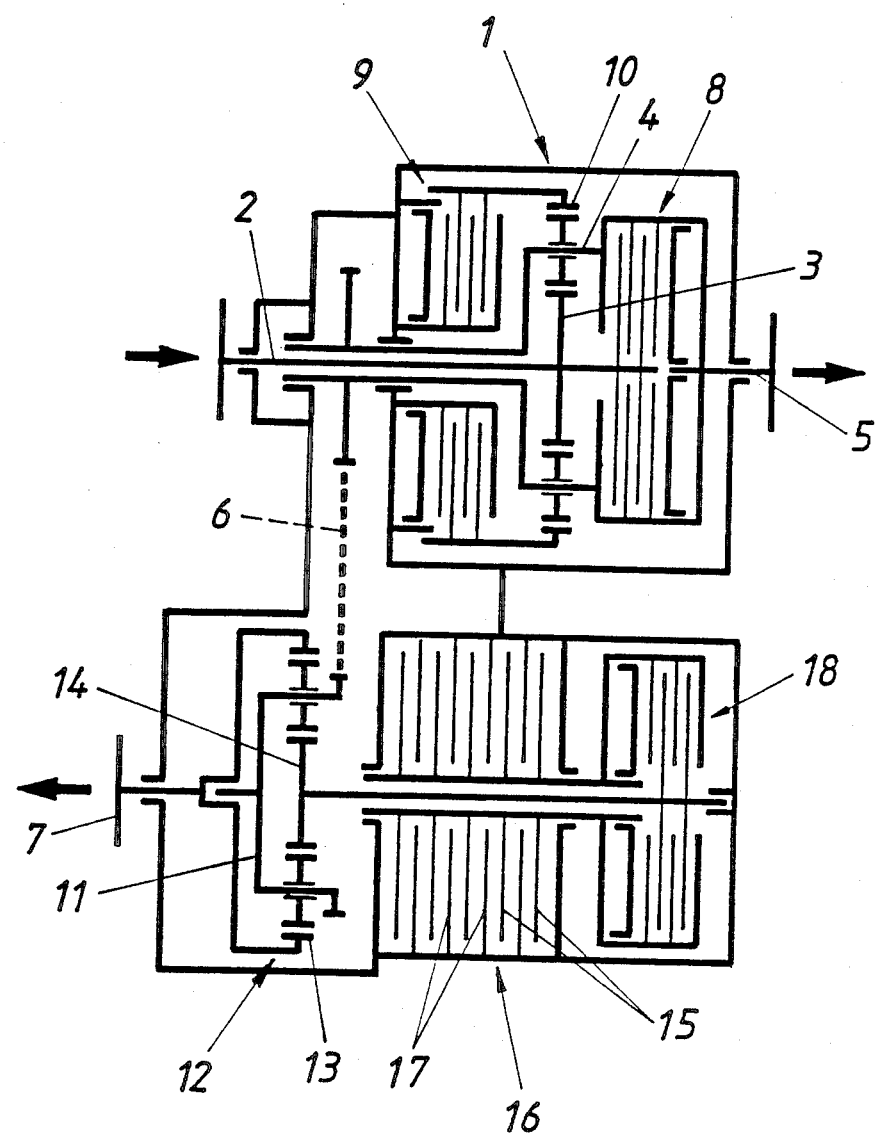

DRIVE SYSTEM FOR MOTOR VEHICLES HAVING TWO DRIVEN AXLES

BACKGROUND OF THE INVENTION

1. Field of the Invention

This invention relates to a drive system for motor vehicles having two driven axles, which system comprises a liquid friction coupling.

2. Description of the Prior Art

In a drive system of that kind which is known from British Patent Specification No. 1,357,106 a planetary gear train comprises a planet carrier that is driven by the motor. Torque is transmitted to the two driven axles of the vehicle from the sun gear and the internal gear, respectively, of the planetary gear train, and the sun gear and internal gear are also connected to respective coupling halves of a liquid friction coupling. In that case the planetary gear train constitutes an interaxle differential, which is restrained by the liquid friction coupling. From the same printed publication it is also known to use the liquid friction coupling alone as an interaxle differential. Said two known embodiments have various disadvantages.

When the vehicle is cornering, the wheels on the two axles rotate at different speeds and the resulting speed difference between the coupling halves of the liquid friction coupling results in a restraining torque, which renders the steering of the vehicle more difficult. The steering will be particularly different at low temperatures because the restraining torque will then be increased by the high viscosity of the liquid contained in the liquid friction coupling. Besides, it is not possible to disconnect each axle from its power source although this will be required, e.g., when the vehicle is to be recovered with one axle raised with blocked wheels or when the vehicle is to be tested on test stands designed to receive only one axle. A braking system provided with an antiblock system also requires, as a rule, that the two axles can be disconnected from their comon power source. Because in the known drive system both coupling halves of the liquid friction coupling rotate, a considerable structural expenditure will be required for a control of the coupling by external means so as to modulate the interdependence of the speed difference between the coupling halves and the torque transmission capacity. Finally, in the embodiment in which the interaxle differential is constituted only by the liquid friction coupling incorporated in the drive train connected to one axle that liquid friction coupling must transmit the entire torque for driving said axle so that that coupling must have a substantial size.

From Published German Application No. 1,802,456 it is already known to associate a controllable coupling with a planetary gear train in such a manner that the coupling is coupled to a rotatable reaction member of the planetary gear train. But that known coupling is a hydraulic coupling or brake which contains a variable quantity of liquid, or the coupling consists of an eddy current coupling. Besides, the entire known arrangement does not serve to drive a vehicle but to control the speed of a machine tool, pump or the like.

SUMMARY OF THE INVENTION

It is an object of the invention to eliminate said disadvantages and to provide a drive system which is of the kind described first hereinbefore and in which it is sufficient to provide a relatively small liquid friction coupling, the interdependence between the speed difference between the two coupling halves and the torque transmission capacity can be modulated in a wide range with relatively simple structural means, and no restraining torques will arise during a steering of the vehicle.

This object is accomplished in accordance with the invention in that one coupling half of the preferably controllable liquid friction coupling is held against rotation, the other coupling half is connected to one torque-transmitting member of a planetary gear train having three torque-transmitting members, another of said three-torque transmitting members is arranged to be driven by the motor, and the third of said torque-transmitting members is connected to the axles to drive the same.

In that drive system one coupling half of the liquid friction coupling does not rotate. That coupling half will usually consist of the liquid-filled housing of that coupling. As a result, simple external structural means may be used to measure those parameters of the liquid friction coupling which influence its torque characteristic, such as the volume, temperature and pressure of the liquid and other parameters and to change said parameters to the desired extent. Because the liquid friction coupling serves to restrain only one torque-transmitting member of the planetary gear train, usually the sun gear or the internal gear, it will be sufficient for the liquid friction coupling to take up only a fractional part of the axle-driving torque so that the liquid friction coupling may be relatively small. If the liquid friction coupling is controllable, restraining torques which are due to different axle speeds can be virtually eliminated.

Within the scope of the invention a clutch is connected between the rotatable coupling half of the liquid friction coupling and that torque-transmitting element of the planetary gear train which is coupled to said rotatable coupling half.

In that case the power train for driving a given axle can be interrupted in known manner so that, e.g., a reduction of the surface speed of the front wheels will not be transmitted to the rear wheels of the motor vehicle. The series arrangement of the clutch and of the liquid friction coupling will afford the advantage that the clutch too is required to transmit only a fractional part of the driving torque which is exerted so that the clutch may also be rather small. Another advantage resides in that the speeds of the members of said clutch will be relatively low so that the clutch can easily be actuated and a simple design can be adopted for the clutch. If the universal joint shaft connecting the planetary gear train to one driven axle can be entirely arrested by the provision of another clutch adjacent to the driven axle, a further advantage will be obtained which resides in that when the operation of said universal joint shaft has been resumed the liquid friction coupling and the clutch will cooperate as a synchronizing unit and, as a result, the dimensions can be further reduced.

BRIEF DESCRIPTION OF THE DRAWING

The drawing is a diagrammatic representation of an illustrative embodiment of a drive system in accordance with the invention.

DETAILED DESCRIPTION OF THE PREFERRED EMBODIMENT

A two-speed transfer transmission 1 comprises an input shaft 2, which drives the sun gear 3 or first torque-transmitting member of a planetary gear train. The planet carrier 4 or third torque-transmitting member of said planetary gear train is connected to a shaft 5 for driving the rear wheels and is also connected via a chain drive 6 and other power-transmitting means to an output member 7 for driving the front wheels. Two multiple-disc clutches 8, 9 are disposed beside the planetary gear train comprising the sun gear 3 and the planet carrier 4. One coupling half of the multiple disc clutch 9 is connected to the housing of that clutch and is thus held against rotation. The other coupling half of the multiple disc clutch is connected to the internal gear 10 or second torque-transmitting member of the planetary gear train 3, 4, 10. One coupling half of the multiple disc clutch 8 is firmly secured to the input shaft 2. The other coupling half of the multiple disc clutch 8 is secured to the planet carrier 4. When the multiple disc clutch 8 is engaged so that its two halves are coupled, whereas the other multiple disc clutch 9 is disengaged, power will directly be transmitted from the input shaft 2 to the output shaft 5 and to the chain drive 6 whereas the planetary gear train 3, 4, 10 will idle. On the other hand, when the multiple disc clutch 8 is disengaged and the clutch 9 is braked to prevent a rotation of the internal gear 10, then the planetary gear train 3, 4, 10 will be operative and the vehicle will be driven at a lower speed, i.e., at a cross-country speed.

The chain drive 6 drives the planet carrier 11 of another planetary gear train 12, which has an internal gear 13 for driving the front axle and a sun gear 14 which is coupled to one coupling half 15 of a liquid friction coupling 16. The other coupling half 17 of the coupling 16 is non-rotatably fixed to the housing of that coupling 16. A multiple disc clutch 18 is connected in series between the sun gear 14 of the planetary gear train 12 and the rotatable coupling half 15 of the liquid friction coupling 16. When the multiple disc clutch 18 is engaged, the sun gear 14 will be restrained by the liquid friction coupling 16, which is connected to the housing. When the multiple disc clutch 18 has been disengaged, the sun gear 14 can idle so that the planetary gear train 12 remains ineffective and the front axle is disconnected from the drive system.

I claim:

1. A drive system for a motor vehicle having a motor and first and second driven axles, comprising
   a liquid friction coupling having first and second coupling halves,
   a planetary gear train comprising first, second and third torque transmitting members,
   means for holding said first coupling half against rotation,
   means for connecting said first torque-transmitting member to said motor, and
   means for connecting said second torque-transmitting member to said second coupling half,
   said third torque-transmitting member being connected to said first driven axle only, and
   said liquid friction coupling being operable for providing a differential drive to said first driven axle relative said second driven axle.

2. The drive system set forth in claim 1, wherein said liquid friction coupling is adapted to be controlled for producing the differential drive between said first and second driven axles.

3. The drive system set forth in claim 1, wherein said drive system comprises clutch means operable for driving said second driven axle.

4. The drive system set forth in claim 3, wherein said clutch means is connected to said first torque-transmitting member and is operable to be connected to said second driven axle.

5. The drive system set forth in claim 1, wherein a clutch is connected between said second torque-transmitting member and said second coupling half and is operable for controlling the engagement of the drive to said first driven axle.

* * * * *